United States Patent
Tong

(10) Patent No.: US 9,254,541 B2
(45) Date of Patent: Feb. 9, 2016

(54) MACHINE TOOL HAVING ROTARY TABLE

(71) Applicant: FANUC CORPORATION, Yamanashi (JP)

(72) Inventor: Zheng Tong, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 212 days.

(21) Appl. No.: 13/955,682

(22) Filed: Jul. 31, 2013

(65) Prior Publication Data

US 2014/0035213 A1 Feb. 6, 2014

(30) Foreign Application Priority Data

Aug. 1, 2012 (JP) .................................. 2012-171277

(51) Int. Cl.
| | | |
|---|---|---|
| G06F 7/00 | (2006.01) | |
| G06F 19/00 | (2011.01) | |
| G05B 11/01 | (2006.01) | |
| G05B 13/02 | (2006.01) | |
| B23Q 1/25 | (2006.01) | |
| B23Q 15/00 | (2006.01) | |
| B23Q 16/02 | (2006.01) | |

(52) U.S. Cl.
CPC ............ B23Q 1/25 (2013.01); B23Q 15/00 (2013.01); B23Q 16/02 (2013.01); *B23Q 2220/004* (2013.01); *G05B 2219/50183* (2013.01)

(58) Field of Classification Search
None
See application file for complete search history.

(56) References Cited

U.S. PATENT DOCUMENTS

| 3,786,721 A | 1/1974 | Reda |
|---|---|---|
| 6,457,383 B1 | 10/2002 | Kschier |
| 2009/0256298 A1 | 10/2009 | Kitaura et al. |
| 2010/0175505 A1 | 7/2010 | Tatsuda |

FOREIGN PATENT DOCUMENTS

| CN | 101396797 A | 4/2009 | |
|---|---|---|---|
| DE | 19946424 A1 | 4/2001 | |
| DE | 202007017253 U1 | 2/2008 | |
| EP | 0899057 A1 | 3/1999 | |
| EP | 2 106 878 A1 | 10/2009 | |
| EP | 2106878 A1 * | 10/2009 | ............... B23Q 1/28 |
| JP | 08101707 A * | 4/1996 | |
| JP | 8101707 A | 4/1996 | |
| JP | 2005288612 A * | 10/2005 | |

(Continued)

OTHER PUBLICATIONS

Decision to Grant a Patent mailed Aug. 5, 2014, corresponding to Japanese patent application No. 2012-171277.
Office Action mailed Apr. 8, 2014, corresponds to Japanese patent application No. 2012-171277.
Office Action issued Apr. 24, 2015, corresponding to Chinese patent application No. 201310331444.9.

(Continued)

*Primary Examiner* — Yolanda Cumbess
(74) *Attorney, Agent, or Firm* — Hauptman Ham, LLP

(57) ABSTRACT

A machine tool includes a rotary table on which a workpiece is mounted, a clamping mechanism for clamping the rotary table against rotation, and a sensor for detecting completion of a clamping operation of the clamping mechanism. A numerical controller for controlling the machine tool calculates the time required for actual operations of the clamping mechanism, taking into account beforehand the processing time for processing a feedback signal from a sensor and the time until the next operation of the machine tool. By controlling the clamping mechanism based on the calculated required time, the cycle time of clamping or unclamping operations is shortened.

6 Claims, 3 Drawing Sheets

(56) References Cited

FOREIGN PATENT DOCUMENTS

| JP | 2008-142874 A | 6/2008 |
| JP | 2009083013 A | 4/2009 |
| JP | 2009248242 A | 10/2009 |
| JP | 2009282829 A | 12/2009 |

OTHER PUBLICATIONS

Office Action dated Jun. 23, 2015, corresponding to German patent application No. 102013107940.7

* cited by examiner

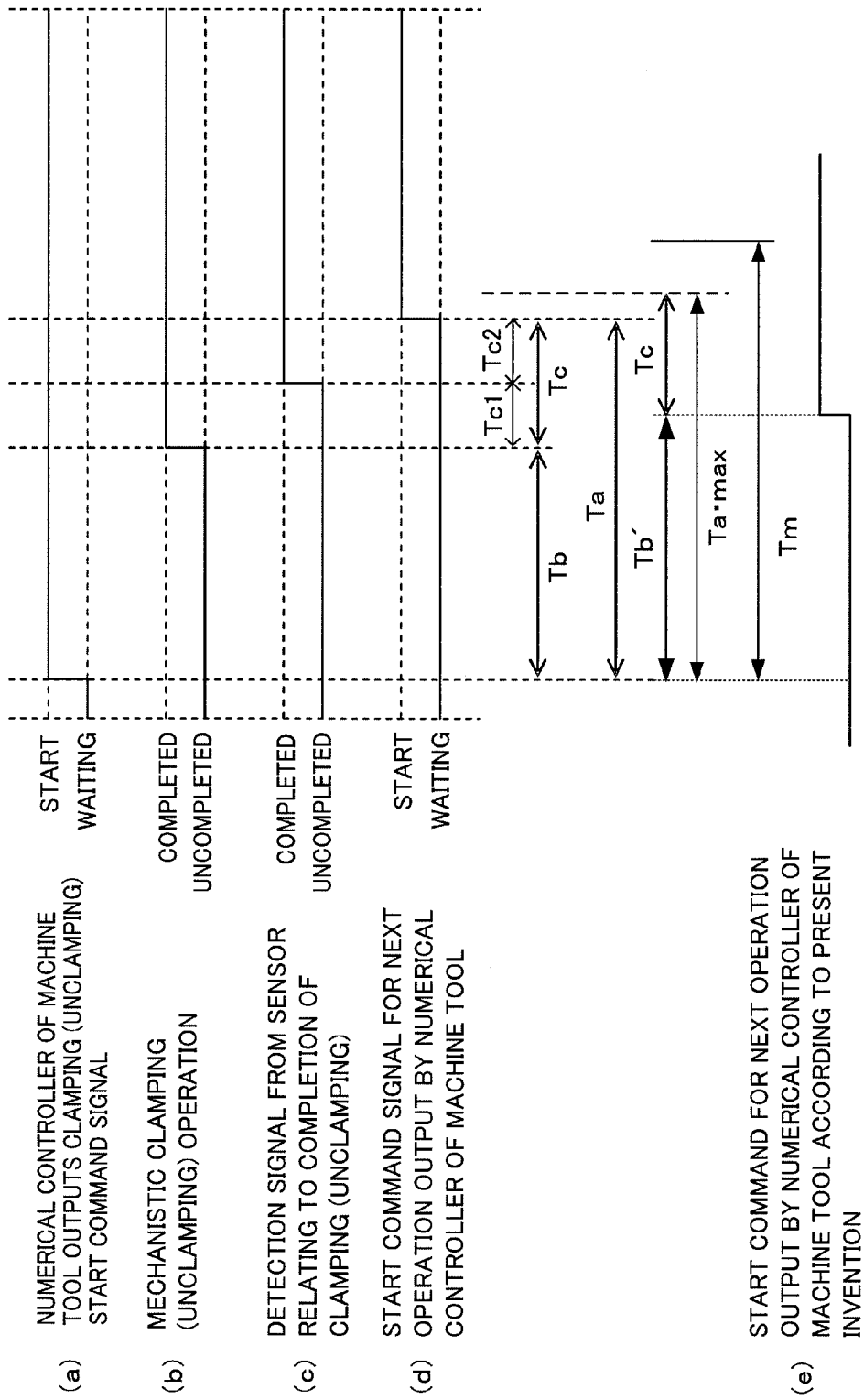

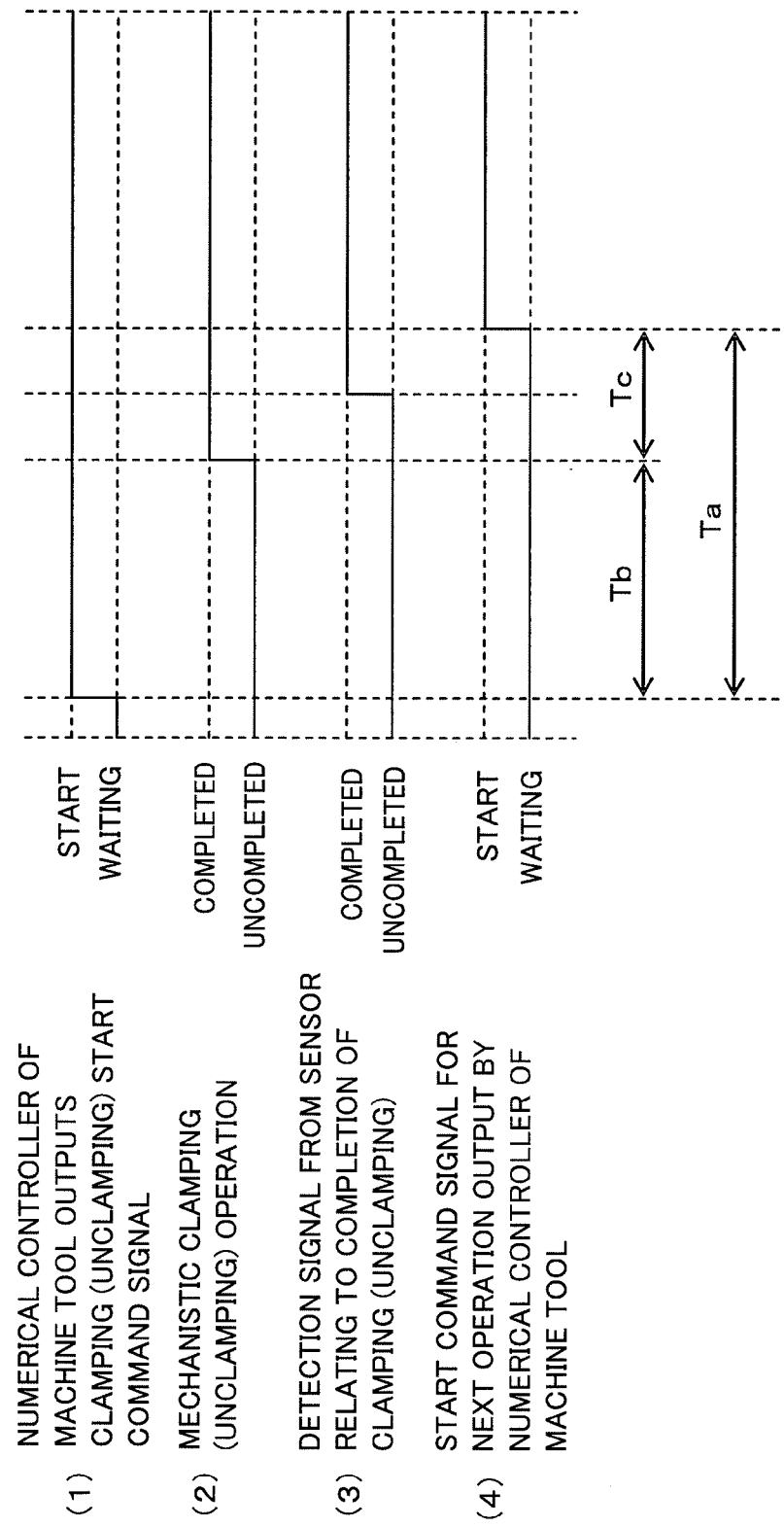

MACHINE TOOL HAVING ROTARY TABLE

RELATED APPLICATIONS

The present application is based on, and claims priority from, Japanese Application Number 2012-171277, filed Aug. 1, 2012, the disclosure of which is hereby incorporated by reference herein in its entirety.

BACKGROUND OF THE INVENTION

1. Field of the Invention

The present invention relates to a machine tool having a rotary table.

2. Description of the Related Art

A machine tool having a rotary table is equipped with a clamping mechanism for determining the phase of the rotary table and maintaining that phase. As described in Japanese Patent Application Laid-Open No. 2009-83013 for example, such a clamping mechanism maintains the determined phase by pushing a pressing member or the like against a disk integral with the rotary table (clamping), or conversely, permits rotation of the rotary table by releasing the pressing member from the disk (unclamping).

Japanese Patent Application Laid-Open No. 2009-248242 describes a clamping device incorporated in a rotary table that checks clamping after a clamping operation by determining the state of clamping based on positional deviation information.

Traditional clamping mechanisms confirm that clamping and unclamping operations are completed by means of a sensor before performing the next operation. Referring to the timing diagram shown in FIG. 4, a procedure of operations (clamping (unclamping)) associated with such a clamping mechanism will be described.

(1) A command signal to start clamping (or unclamping) is output by a numerical controller of the machine tool.
(2) Mechanistic clamping (or unclamping) operation of the clamping mechanism is started.
(3) Completion of the mechanistic clamping (or unclamping) operation of the clamping mechanism is detected by a sensor.
(4) A command signal for the next operation of the machine tool is output by the numerical controller.

As shown in FIG. 4, the time (clamping mechanism operation time) from output of the clamping (or unclamping) start command signal in (1) to output of the command signal for the next operation of the machine tool by the numerical controller in (4) is Ta. Because the clamping mechanism operation time Ta is not constant, a current clamping mechanism determines Ta by measurement with a sensor and the numerical controller of the machine tool. The actual operation time taken for clamping (or unclamping) (actual clamping mechanism operation time) is time Tb from output of the clamping (or unclamping) start command signal in (1) to start of clamping (unclamping) operation of the clamping mechanism in (2).

It can be thus deemed that a clamping (unclamping) process involves an extra processing time Tc equal to clamping mechanism operation time Ta minus actual clamping mechanism operation time Tb (i.e., Tc=Ta−Tb). The processing time Tc is substantially constant as it essentially depends on the throughput of the tool (time required for signal transmission and time required for signal processing). For a fast clamping mechanism that performs clamping (unclamping) at high speed, the processing time Tc accounts for a relatively large portion of clamping mechanism operation time Ta, being a non-negligible length of time.

SUMMARY OF THE INVENTION

The present invention addresses the above problem of the prior art technique with the object of providing a machine tool having a rotary table that takes into account beforehand the processing time for processing a feedback signal from a sensor and the time until the next operation of the machine tool, wherein the time required for actual operations of the clamping mechanism is determined by the numerical controller of the machine tool and the clamping mechanism is controlled based on the determined time required for actual operations, thereby shortening the cycle time of clamping or unclamping operations.

A machine tool having a rotary table according to the present invention is controlled by a numerical controller, and includes a rotary table on which a workpiece is mounted, a clamping mechanism for clamping the rotary table against rotation, and a sensor for detecting completion of a clamping operation or unclamping operation of the clamping mechanism and outputting a completion signal. The machine tool further includes a clamping mechanism operation time measuring unit that, when a machining program is executed and a clamp command or an unclamp command is output by the numerical controller, measures a clamping mechanism operation time from the time when the command is output to the time when completion of clamping or unclamping is detected by the sensor and the machine tool starts a next operation, a clamping mechanism operation time storage unit that stores the measured clamping mechanism operation time, and an actual clamping mechanism operation time calculating unit that determines an actual clamping mechanism operation time by subtracting, from the stored clamping mechanism operation time, a preset amount of time required from completion of clamping mechanism operation to start of the next operation by the machine tool. The controller outputs a clamp command or an unclamp command at a cycle time corresponding to the actual clamping mechanism operation time determined by the clamping mechanism operation time calculating unit and starts the next operation.

The actual clamping mechanism operation time calculating unit may determine the actual clamping mechanism operation time by subtracting a preset amount of time required from completion of clamping mechanism operation to start of the next operation by the machine tool, from a longest one of clamping mechanism operation times stored in the clamping mechanism operation time storage unit.

The actual clamping mechanism operation time calculating unit may determine the actual clamping mechanism operation time by subtracting a preset amount of time required from completion of clamping mechanism operation to start of the next operation by the machine tool, from the longest one of clamping mechanism operation times of a predetermined number of most recent clamping or unclamping operations stored in the clamping mechanism operation time storage unit.

The actual clamping mechanism operation time calculating unit may determine the actual clamping mechanism operation time by subtracting a preset amount of time required from completion of clamping mechanism operation to start of the next operation by the machine tool, from the clamping mechanism operation time of a last clamping or unclamping operation stored in the clamping mechanism operation time storage unit.

The clamping mechanism operation time storage unit may be configured not to store the clamping mechanism operation time of a first operation of the clamping mechanism of the rotary table that is performed after the machine tool starts operation.

The sensor may be any of a position detection sensor, a displacement sensor, a pressure sensor, and a flow sensor.

According to the present invention, there can be provided a machine tool having a rotary table that takes into account beforehand the processing time for processing a feedback signal from a sensor and the time until the next operation, wherein the time required for actual operations of the clamping mechanism is determined by the numerical controller of the machine tool and the clamping mechanism is controlled based on the determined time required for actual operations, thereby shortening the cycle time of clamping or unclamping operations.

BRIEF DESCRIPTION OF THE DRAWINGS

These and other objects and features of the present invention will become apparent from the following description of exemplary embodiments with reference to the accompanying drawings in which:

FIG. 3 is a timing diagram illustrating operations of the clamping mechanism of FIG. 2; and FIG. 4 is a timing diagram illustrating operations of a traditional clamping mechanism.

DETAILED DESCRIPTION OF THE PREFERRED EMBODIMENTS

Figure 1:
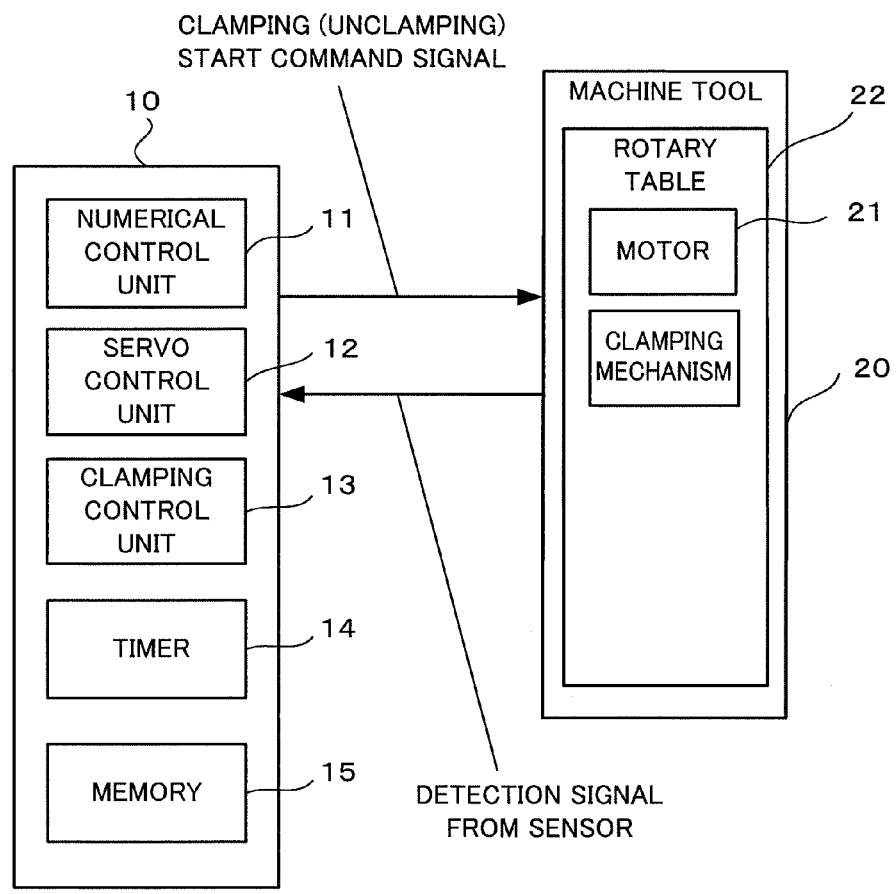
FIG. 1 illustrates a machine tool having a rotary table.

Referring to FIG. 1, a machine tool having a rotary table will be described.

A machine tool 20 has a rotary table 22. A numerical controller 10 for controlling the machine tool 20 includes a numerical control unit 11, a servo control unit 12, and a clamping control unit 13. The machine tool 20 includes a motor 21 for driving the rotary table 22. The rotary table 22 is retained in the phase determined by the clamping mechanism illustrated in FIG. 2.

The numerical control unit 11 of the numerical controller 10 includes a microprocessor (CPU) capable of high-speed computation, analyzes an NC program for machining a workpiece, and processes the analyzed NC program on a per-block basis. When a block of the NC program processed by the numerical control unit 11 contains a clamp command, the numerical control unit 11 sends the clamp command to the clamping control unit 13. The clamping control unit 13 issues a command for a clamping (unclamping) operation to the clamping mechanism of the machine tool 20 and controls clamping (unclamping) of the clamping mechanism. The numerical controller 10 also has a timer function and memory for storing various data.

Figure 2:
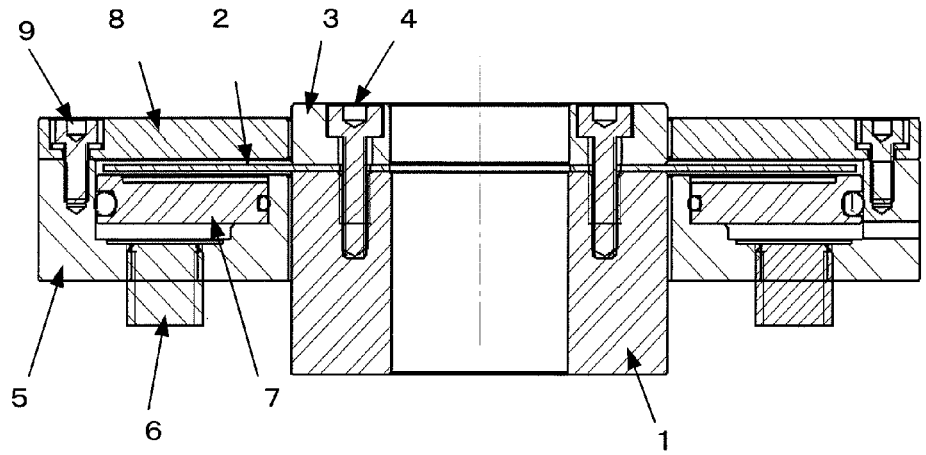
FIG. 2 illustrates a clamping mechanism that determines the phase of the rotary table of FIG. 1 and maintains that phase.

Turning to FIGS. 2 and 3, control of clamping (or unclamping) of the clamping mechanism for maintaining the determined phase of the rotary table in FIG. 1 will be described.

As depicted in FIG. 2, a clamping disk 2 is fixed to a shaft 1 of the motor 21 (FIG. 1) by retaining the clamping disk 2 in a disk holder 3 and screwing bolts 4 into them. A sensor 6 is fixed to the cylinder 5, to which a rear plate 8 is fixed with a bolt 9.

To clamp the clamping disk 2, a pressing member 7, which is to be pressed against the clamping disk 2, moves up so that the clamping disk 2 is held between the pressing member 7 and the rear plate 8. The pressing member 7 moving up and pressing against the clamping disk 2 (that is, the clamping disk 2 being clamped between the pressing member 7 and the rear plate 8) is detected by the sensor 6. The sensor 6 also detects the pressing member 7 moving down and releasing the press on the clamping disk 2.

Upward and downward movement of the pressing member 7 is effected by driving force such as air, as with known clamping mechanisms. The sensor 6 may be any of a position detection sensor, a displacement sensor, a pressure sensor, and a flow sensor.

The clamping operation of the clamping mechanism shown in FIG. 2 will now be described with FIG. 3.

In FIG. 3, (a) represents the time at which the numerical controller 10 which controls the machine tool 20 outputs a clamping (or unclamping) start command; (b) indicates that in response to the clamping (or unclamping) start command, the clamping mechanism starts and continues to perform clamping (or unclamping) operation; (c) represents the time at which the sensor 6 detects completion of the mechanistic clamping (or unclamping) operation of the clamping mechanism and outputs a completion signal to the numerical controller 10; and (d) represents the time at which the numerical controller outputs a start command signal for the next operation of the machine tool.

First, as a preliminary process, processing time Tc1 required for processing a feedback signal from the sensor 6, which detects completion of clamping (or unclamping), and processing time Tc2 from detection of completion of clamping (or unclamping) by the sensor 6 to start of the next operation by the machine tool 20 are determined by measurement in an experiment. The total processing time Tc (=Tc1+Tc2) is then stored in the memory 15 of the numerical controller 10. As shown in FIG. 3, the processing time Tc, being a fixed value, corresponds to the time period from completion of the mechanistic clamping (or unclamping) operation of the clamping mechanism in (b) to output of a start command signal for the next operation of the machine tool 20 by the numerical controller 10 in (d). The experiment is assumed to be conducted under conditions in which the length of time from the end of clamping (unclamping) operation in (b) to outputs of a start command signal for the next operation of the machine tool 20 by the numerical controller 10 in (d) can be measured with no time delay.

Next, steps (a) to (d) of FIG. 3 are carried out while workpiece machining is actually performed using the machine tool 20, and time Ta from output of a clamping (or unclamping) start command signal in (a) to output of a command signal for the next operation of the machine tool 20 in by the numerical controller 10 in (d) (i.e., Ta is clamping mechanism operation time representing the time taken for the clamping mechanism to perform clamping or unclamping) is measured and stored in the memory 15. The time when the numerical controller 10 outputs a command signal for the next operation of the machine tool 20 may instead be the time when the numerical controller 10 outputs a signal for releasing interlocking of control axes or the like in response to a clamping (unclamping) signal from the sensor 6.

The clamping mechanism operation time Ta is measured n times and the measurement results Ta1, Ta2, Ta3, . . . Tan are stored in the memory 15. Of the n clamping mechanism operation times (Ta1, Ta2, Ta3, . . . Tan) stored in the memory 15, the longest one is determined to be maximum clamping mechanism operation time Ta·max. The number of times 'n' the clamping mechanism operation time Ta is measured is determined based on the time required for the operation of the clamping mechanism to become stable. The value of n may be small when the clamping mechanism is operating stably, while the value of n is set to a large value when the clamping mechanism is operating not very stably.

Extraction of the longest one of the n clamping mechanism operation times stored in the memory 15 as maximum clamping mechanism operation time Ta·max is done by an actual clamping mechanism operation time calculating unit included in the machine tool. The actual clamping mechanism operation time calculating unit further calculates actual clamping operation time Tb' of a clamping (unclamping) operation from the extracted maximum clamping mechanism operation time Ta·max and processing time Tc (Tb'=Ta·max−Tc). The numerical controller 10 issues a clamping (unclamping) start command signal ((a) in FIG. 3). Upon elapse of the actual clamping operation time Tb' after the output of the clamping (unclamping) start command signal, the numerical controller 10 outputs an operational signal for clamping (unclamping) and also outputs a start command for the next operation of the machine tool 20 as shown in (e) of FIG. 3. This can start the next operation of the machine tool 20 earlier by the amount of processing time Tc (which is a fixed value representing the time period from completion of mechanistic clamping or unclamping operation of the clamping mechanism to output of a start command signal for the next operation by the numerical controller), which can correspondingly shorten the cycle time.

In the above description, the actual clamping mechanism operation time calculating unit selects the longest one of n clamping mechanism operation times (Ta1, Ta2, Ta3, . . . Tan) stored in the memory 15 for the maximum clamping mechanism operation time Ta·max, which is used for calculating the time at which to output a start command for the next operation of the machine tool 20 shown in (e) in FIG. 3. Alternatively, the maximum clamping mechanism operation time Ta·max may instead be the longest one of m clamping mechanism operation times of the m most recent clamping (or unclamping) operations (m is a fixed value, where 1<m<n). That is, by subtracting the processing time Tc from Ta·max thus determined, the time at which to output a start command for the next operation of the machine tool 20 is determined.

As a further alternative, the actual clamping mechanism operation time calculating unit may select the clamping mechanism operation time of the last clamping (or unclamping) operation as the maximum clamping mechanism operation time Ta·max, which is used for calculating the time at which to output a start command for the next operation of the machine tool 20 shown in (e) in FIG. 3. That is, by subtracting the processing time Tc from Ta·max thus determined, the time at which to output a start command for the next operation of the machine tool 20 is determined.

A clamping mechanism using a cylinder may take a longer operation time than usual when operating for the first time after being halted for some time, so such an operation time is not be used for calculation of actual clamping operation time Tb. In such a case, a clamping mechanism operation time associated with the second or subsequent operation is used in calculation of the actual clamping operation time Tb'.

It is also possible to predefine a maximum allowable time Tm from issuing of a command for clamping mechanism operation by the controller of the machine tool to receiving of a clamping mechanism operation completion signal, on the assumption that clamping mechanism operation can be improper and in consideration of the tool's operation pattern. Note that the maximum allowable time Tm should be longer than the actual clamping operation time Tb'. The next operation of the machine tool 20 is not to take place unless a clamping mechanism operation completion signal is received even when the maximum allowable time Tm has elapsed after the controller of the machine tool issued a command for starting operation of the clamping mechanism.

According to the present invention, there can be provided a machine tool having a rotary table that takes into account beforehand the processing time for processing a feedback signal from a sensor and the time until the next operation, wherein the time required for actual operations of the clamping mechanism is determined by the numerical controller of the machine tool and the clamping mechanism is controlled based on the determined time required for actual operations, thereby shortening the cycle time of clamping or unclamping operations.

The invention claimed is:

1. A machine tool that is configured to be controlled by a numerical controller, the machine tool comprising:
   a rotary table on which a workpiece is to be mounted;
   a clamping mechanism configured to clamp the rotary table against rotation;
   a sensor configured to
      detect completion of a clamping operation or unclamping operation of the clamping mechanism, and
      output a completion signal;
   a clamping mechanism operation time measuring unit, wherein when a machining program is executed and a clamp command or an unclamp command is output by the numerical controller, the clamping mechanism operation time measuring unit is configured to measure a clamping mechanism operation time
      from a time when the clamp or unclamp command is output
      to a time (i) when completion of the clamping or unclamping operation is detected by the sensor and (ii) the machine tool starts a next operation;
   a clamping mechanism operation time storage unit configured to store the measured clamping mechanism operation time; and
   an actual clamping mechanism operation time calculating unit configured to determine an actual clamping mechanism operation time by subtracting, from the stored clamping mechanism operation time, a preset amount of time required from completion of clamping mechanism operation to start of the next operation by the machine tool,
   wherein another clamp command or another unclamp command is output by the numerical controller at a cycle time corresponding to the actual clamping mechanism operation time determined by the clamping mechanism operation time calculating unit for the machine tool to start the next operation.

2. The machine tool according to claim 1, wherein
   the clamping mechanism is configured to perform multiple clamping or unclamping operations,
   the clamping mechanism operation time measuring unit is configured to measure multiple clamping mechanism operation times corresponding to the multiple clamping or unclamping operations,
   the clamping mechanism operation time storage unit is configured to store the multiple measured clamping mechanism operation times, and
   the actual clamping mechanism operation time calculating unit is configured to determine the actual clamping mechanism operation time by subtracting the preset amount of time from a longest one of the stored clamping mechanism operation times.

3. The machine tool according to claim 1, wherein the clamping mechanism is configured to perform multiple clamping or unclamping operations, the clamping mechanism operation time measuring unit is configured to measure multiple clamping mechanism operation times corresponding to the multiple clamping or unclamping operations, the clamping mechanism operation time storage unit is configured to store the multiple measured clamping mechanism operation times, and the actual clamping mechanism operation time calculating unit is configured to determine the actual clamping mechanism operation time by subtracting the preset amount of time from a longest one of the stored clamping mechanism operation times of a predetermined number of most recent clamping or unclamping operations among the multiple clamping or unclamping operations.

4. The machine tool according to claim 1, wherein the clamping mechanism is configured to perform multiple clamping or unclamping operations, the clamping mechanism operation time measuring unit is configured to measure multiple clamping mechanism operation times corresponding to the multiple clamping or unclamping operations, the clamping mechanism operation time storage unit is configured to store the multiple measured clamping mechanism operation times, and the actual clamping mechanism operation time calculating unit is configured to determine the actual clamping mechanism operation time by subtracting the preset amount of time from the stored clamping mechanism operation time of a last clamping or unclamping operation among the multiple clamping or unclamping operations.

5. The machine tool according to claim 1, wherein the clamping mechanism operation time storage unit is configured not to store the clamping mechanism operation time of a first operation of the clamping mechanism that is performed after the machine tool starts operation.

6. The machine tool according to claim 1, wherein the sensor is selected from the group consisting of a position detection sensor, a displacement sensor, a pressure sensor, and a flow sensor.

* * * * *